March 30, 1926. Re. 16,303

C. GIRL

BUMPER

Original Filed Jan. 31, 1923

INVENTOR

Christian Girl,

By Hull, Brock & West,

Attys.

Reissued Mar. 30, 1926. Re. 16,303

UNITED STATES PATENT OFFICE.

CHRISTIAN GIRL, OF DETROIT, MICHIGAN, ASSIGNOR TO THE C. G. SPRING & BUMPER COMPANY, OF DETROIT, MICHIGAN, A CORPORATION OF DELAWARE.

BUMPER.

Original No. 1,472,905, dated November 6, 1923, Serial No. 615,997, filed January 31, 1923. Application for reissue filed January 28, 1924. Serial No. 689,137.

*To all whom it may concern:*

Be it known that I, CHRISTIAN GIRL, a citizen of the United States, residing at Detroit, in the county of Wayne and State of Michigan, have invented a certain new and useful Improvement in Bumpers, of which the following is a full, clear, and exact description, reference being had to the accompanying drawings.

This invention relates to automobile bumpers, and more particularly to bumpers of the multiple-bar construction, as typified in the patent to Allan L. McGregor, No. 1,372,154, issued March 22, 1921.

Figure 1:
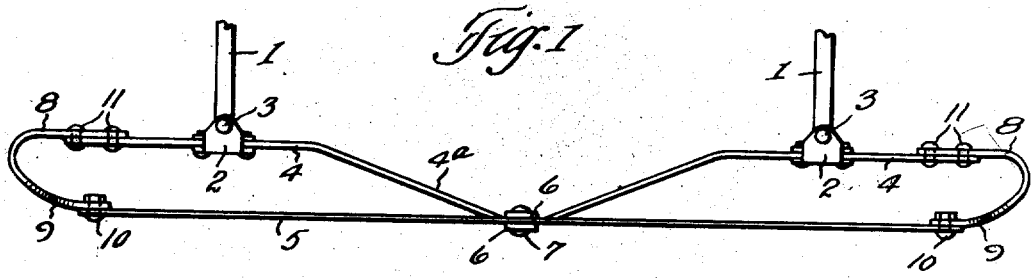
Figure 2:
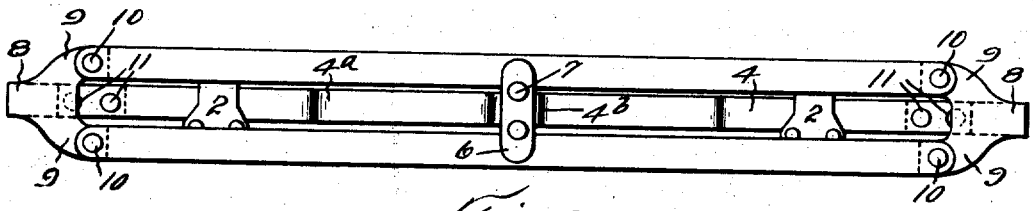
Figure 3:
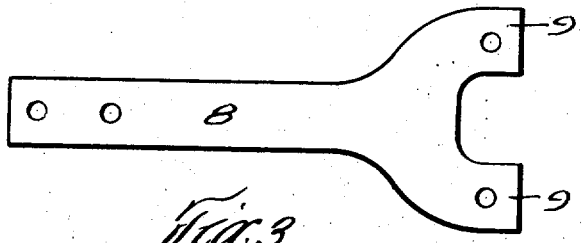

It is the general purpose and object of the invention to provide a new, improved, and simplified connection between the ends of the bars or plates constituting the bumper. I accomplish the foregoing object in and through the construction and arrangement of parts shown in the drawings herein, wherein Fig. 1 represents a plan view of a bumper constructed in accordance with my invention and showing the same connected to the supporting arms by which the bumper in turn is connected to the side members of a vehicle; Fig. 2 an elevation of the bumper shown in the preceding view; and Fig. 3 a detail in elevation of the plate employed for connecting the ends of the bumper bars or plates, the plate being shown in its extended or unbent shape.

Describing the various parts herein by reference characters and assuming (for convenience of description) that the bumper is to be applied to the front end of an automobile, 1 denotes a pair of supporting arms of any suitable character for connecting a bumper to the side members of the vehicle, and 2 represents clamps which are pivotally connected to the front ends of the members 1, as indicated at 3, the clamps being adjustably mounted upon the end portions 4 of the intermediate rear bar of the bumper. This rear bar may be of any shape, the one shown herein having a V-shaped intermediate portion $4^a$, the center $4^b$ of such V extending between the upper and lower bars 5 which constitute the front or impact section of the bumper. The front and rear bars are connected at their central portions by means of plates 6 and rivets or bolts 7.

The front bars or plates 5 and the end portions 4 of the rear bar or plate are substantially parallel, with their ends nearly in fore-and-aft alignment. For the purpose of connecting the extreme ends, I employ plates such as shown in developed or extended form in Fig. 3, each of the said plates being generally T-shaped and comprising a central body or stem 8 and a widened or forked end, the forks being indicated at 9. The plate is bent into U-shape, as will be seen in Figs. 1 and 2, and the forks 9 are connected, as by rivets or bolts 10, to the ends of the bars or plates 5, while the stem or body portion 8 is connected by bolts or rivets 11 to the adjacent end 4 of the rear bar. Two such bars or plates 8, 9 are employed, one at each end of the bumper structure. When the parts are thus assembled, the bumper is provided with looped ends, the end of each loop comprising a plate, 8, 9.

The bars or plates 8, 9 are of ordinary spring-steel, such as is employed for the bars or plates 4 and 5. In consequence, the said bars or plates 8 and 9 provide yielding, resilient or flexible connections between the ends of the bars or plates 4 and 5.

By the construction shown and described, a bumper of the multiple-bar type may be constructed with looped ends and the resultant bumper will be not only efficient in operation, but economical of production, and sightly in appearance.

Having thus described my invention, what I claim is:

1. A bumper comprising a pair of vertically spaced bars and an auxiliary bar having its ends spaced rearwardly from the ends of the first-mentioned bars, and a forked plate bent into looped form and having its forks connected with the ends of the first-mentioned bars and its intermediate portion or stem connected with the adjacent end of the other bar.

2. A bumper comprising an impact section having vertically spaced ends and an auxiliary section having an end spaced rearwardly from the ends of the impact section, and a forked plate bent into looped form and having its forks connected with the ends of the impact section and its intermediate portion or stem connected with the end of the auxiliary section.

3. An automobile bumper comprising a front or impact section and a rear or auxiliary section, the ends of the said sections being spaced apart, and a substantially U-shaped plate rigidly connected to the ends of said sections and extending longitudinally of said bumper and forming looped ends therefor.

4. An automobile bumper comprising an impact section having vertically spaced ends and an auxiliary bar, an end of the auxiliary bar being spaced rearwardly from the corresponding ends of the impact section, and a looped plate rigidly secured at one end to the auxiliary bar and at its opposite end to the ends of the impact section, the loop of said plate constituting a longitudinal looped extension of the ends of said bars.

5. An automobile bumper comprising a pair of impact bars having their ends spaced and in substantially vertical alignment, an auxiliary bar having its ends spaced rearwardly from the corresponding ends of the impact bars and located intermediate of such bars, and plates connecting the ends of the impact and auxiliary bars, each being bent into looped form and having one end connected to an end of the auxiliary bar and having its opposite end forked and connected with the corresponding ends of the impact bars.

6. An automobile bumper comprising a front or impact bar and a rear or auxiliary bar, the end of one bar being spaced from the corresponding end of the other bar, and a looped plate rigidly connected to such ends, the loop extending longitudinally of the bumper.

7. A bumper comprising one or more front or impact bars and a rear or auxiliary bar, corresponding ends of said bars being spaced apart, and a resilient looped member at each end of the bumper and rigidly connected to the ends of the impact and auxiliary bars, the loops extending longitudinally of the bumper.

8. A bumper comprising a pair of vertically spaced impact bars and a rear or auxiliary bar having its top edge and its bottom edge spaced respectively below the top edge of the upper of said impact bars and above the bottom edge of the lower of said impact bars, and a connecting member secured at one end to each end of the rear or auxiliary bar, each of said connecting members having one end forked, and means connecting such forks to the ends of the impact bars adjacent thereto.

9. An automobile bumper comprising a pair of front or impact bars, a rear or auxiliary bar connected to the body portions of the front or impact bars and having its outer end adjacent to the outer ends of the front or impact bars, and a connecting member secured at one end to the outer end of the rear or auxiliary bar, the said connecting member being forked, and means connecting such forks to the ends of the impact bars adjacent thereto.

10. An automobile bumper comprising a plurality of front or impact bars, a rear or auxiliary bar connected to the body portions of the front or impact bars and having an outer end adjacent to the outer ends of the front or impact bars, and a resilient connecting member secured at one end to the outer end of the rear or auxiliary bar, the said connecting member being forked, and means connecting such forks to the ends of the impact bars adjacent thereto.

11. An automobile bumper comprising a plurality of front or impact bars, a rear or auxiliary bar connected to the body portions of the front or impact bars and having an outer end adjacent to the corresponding outer ends of the front or impact bars, and forked means connecting such outer end of the rear or auxiliary bar with the ends of the front or impact bars adjacent thereto.

12. An automobile bumper comprising a plurality of front or impact bars, a rear or auxiliary bar having an outer end adjacent to the outer ends of the front or impact bars, and a connecting member secured at one end to the outer end of the rear or auxiliary bar, the said connecting member being forked, and means connecting such forks to the ends of the impact bars adjacent thereto.

In testimony whereof I hereunto affix my signature.

CHRISTIAN GIRL.